(12) United States Patent
Maeno

(10) Patent No.: US 7,027,693 B2
(45) Date of Patent: Apr. 11, 2006

(54) MOUNTING METHOD FOR OPTICAL MEMBER AND OPTICAL MODULE

(75) Inventor: Yoshinori Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 252 days.

(21) Appl. No.: 10/643,903

(22) Filed: Aug. 20, 2003

(65) Prior Publication Data
US 2004/0042739 A1    Mar. 4, 2004

(30) Foreign Application Priority Data
Aug. 27, 2002  (JP) ............... 2002-246615

(51) Int. Cl.
    G02B 6/26    (2006.01)
(52) U.S. Cl. .......................... 385/52; 385/74
(58) Field of Classification Search ................. 385/49, 385/52, 88–94, 33–35
See application file for complete search history.

(56) References Cited

U.S. PATENT DOCUMENTS

| | | | | |
|---|---|---|---|---|
| 4,426,132 A * | 1/1984 | Tsunoda et al. | ............ | 359/622 |
| 6,504,107 B1 * | 1/2003 | Kragl | ............ | 174/260 |
| 6,739,760 B1 * | 5/2004 | Cheng et al. | ............ | 385/89 |
| 6,748,131 B1 * | 6/2004 | Steinberg et al. | ............ | 385/20 |

OTHER PUBLICATIONS

Masahiro Uekawa et al., "Optical Member with Handling Portion and Method for Manufacturing Optical Member and Method for Mounting Optical Member and Optical Module", filed May 2, 2002 (U.S. Appl. No. 10/136,326.
Hongtao Han et al., "Integration of silicon bench micro-optics", Proc. SPIE vol. 3631, pp. 234-243.
Hironori Sasaki et al., "Packaging Technologies for Precise Alignment of Light Sources and Silicon Microlenses", vol. 5, No. 5, pp. 466-471.

* cited by examiner

Primary Examiner—Juliana Kang
(74) Attorney, Agent, or Firm—Wenderoth, Lind & Ponack, L.L.P.

(57) ABSTRACT

When an optical member which have a plurality of luminous flux converters formed in a line on a surface of an optical substrate is mounted on a support substrate having at least one groove, at least two parts of the side surfaces of the optical member are brought into contact with the groove to perform positioning, and an adhesive agent is filled between at least one part of a portion which opposes the groove on the plane of the optical member and which is not in contact with the groove and the support substrate to cause the optical member and the support substrate to adhere to each other.

16 Claims, 14 Drawing Sheets

MOUNTING METHOD FOR OPTICAL MEMBER AND OPTICAL MODULE

BACKGROUND OF THE INVENTION

Field of the Invention

The present invention relates to a method of mounting an optical member, preferably used as a device of an optical communication apparatus or a computer, and an optical module using the optical member.

A microlens or a micro-optical device using a diffractive optical device is used as an optical member for optical communication or an optical disk reproduction device such as a CD player. Such a microlens has, e.g., a cylindrical shape or a hog-backed shape. The optical member of this type is manufactured such that a desired shape of a lens or the like is formed on, e.g., a silicon substrate by a photolithographic process and subjected to an etching process. The microlens or the micro-optical device has a size of about 100 µm square to several hundred micrometer square.

In general, the optical member is used on a support substrate such as a silicon substrate or the like. In the support substrate, a V-shaped groove having a V-shaped section and formed by etching or cutting, a terrace for arranging a semiconductor laser, a groove, being larger than a V-shaped groove, for arranging an optical member, or the like is formed. The V-shaped groove, terrace, groove, and the like are formed at high accuracy, the outlines of optical members to be arranged are formed at high accuracy in advance, and these optical members are arranged in the V-shaped groove or the like at a submicron accuracy, so that the optical members can be mounted at high accuracy. The optical members are arranged by using a component arrangement apparatus which is called a bonder.

When an optical module is manufactured by using the optical member constituted by a silicon substrate, in general, a mounting method which arranges the optical member in a V-shaped groove formed in a silicon support substrate and fixes the optical member is employed. As a fixing method, a method using an adhesive agent, solder, or the like is generally used.

However, in the mounting method, positioning is performed such that the optical member is brought into contact with the V-shaped groove, and the optical member which is in partial contact with the V-shaped groove is adhered and fixed to the V-shaped groove. For this reason, the fixing position of the optical member changes depending on the thickness of the adhesive agent, the positioning is not performed at high accuracy, and the mounting accuracy deteriorates. In addition, in the conventional mounting method, the optical member requires high accuracy with a large number of parts. When this condition is not satisfied, the optical member is determined as a defective optical member. This condition is an obstacle to an increase in yield.

SUMMARY OF THE INVENTION

The present invention has been made in consideration of the above problems, and has as its object to provide a method of mounting an optical member which can achieve high-accuracy mounting and high yield and an optical module mounted with high accuracy.

In order to solve the above problem, according to a first aspect of the present invention, there is provided a mounting method for an optical member in which the optical member having a plurality of luminous flux converters formed in a line on a surface of an optical substrate is mounted on a support substrate having at least one groove. In this mounting method, at least two parts of the side surfaces of the optical member are brought into contact with the groove to perform positioning, and an adhesive agent is filled between at least one part of a portion which opposes the groove on the plane of the optical member and which is not in contact with the groove and the support substrate to cause the optical member and the support substrate to adhere to each other.

According to a second aspect of the invention, there is provided an optical module. The optical module includes: an optical member having a plurality of luminous flux converters formed in a line on a surface of an optical substrate; and a support substrate having at least one groove for mounting an optical member, wherein at least two parts of the side surfaces of the optical member are in contact with the groove and are used in positioning. An adhesive agent is filled between at least one part of a portion which opposes the groove on the plane of the optical member and which is not in contact with the groove and the support substrate to cause the optical member and the support substrate to adhere to each other.

In the above description, the luminous flux converter is a device having a function of converting a luminous flux. For example, the luminous flux converter performs convergence, divergence, reflection, deflection, and the like to a luminous flux. The luminous flux converter includes a device for converting an incident luminous flux into parallel rays by an arrangement condition. As a concrete example of the luminous flux converter, a device or the like constituted by a lens and a diffractive optical device is cited.

As an optical substrate used in an optical member, for example, a silicon crystal substrate can be used. As other crystal substrates, substrates using GaAs, InP, GaP, SiC, Ge, and the like as materials can be used. In addition, as a support substrate, a silicon crystal substrate can also be used.

BRIEF DESCRIPTION OF THE DRAWINGS

FIGS. 2A and 2B show the configuration of an optical module according to a first embodiment of the present invention, in which FIG. 2A is a sectional view along a position A–A' in FIG. 2B and FIG. 2B is an upper view of an optical module.

FIGS. 4A and 4B show the configuration of an optical module according to a second embodiment of the present invention, in which FIG. 4A is a sectional view along a position B–B' in FIG. 4B and FIG. 4B is an upper view of an optical module.

FIGS. 6A and 6B show the configuration of an optical module according to a third embodiment of the present invention, in which FIG. 6A is a sectional view along a position C–C' in FIG. 6B and FIG. 6B is an upper view of an optical module.

FIGS. 8A and 8B show the configuration of an optical module according to a fourth embodiment of the present invention, in which FIG. 8A is a sectional view along a position D–D' in FIG. 8B and FIG. 8B is an upper view of an optical module.

FIGS. 10A and 10B show the configuration of an optical module according to a fifth embodiment of the present invention, in which FIG. 10A is a sectional view along a position E–E' in FIG. 10B and FIG. 10B is an upper view of an optical module.

DETAILED DESCRIPTION OF THE PREFERRED EMBODIMENTS

Figure 1:
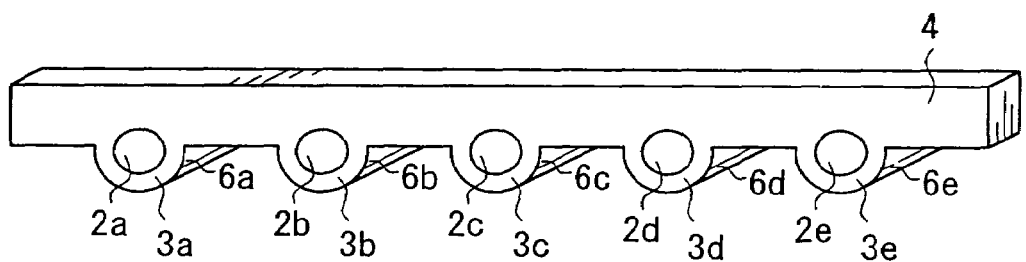
FIG. 1 is a perspective view showing the configuration of a lens array according to an embodiment of the present invention.

Embodiments of the present invention will be described below with reference to the accompanying drawings. The same reference numerals as in the following description and the accompanying drawings denote constituent elements having substantially the same functions and configurations, and overlapping descriptions will be omitted.

Figure 2A:
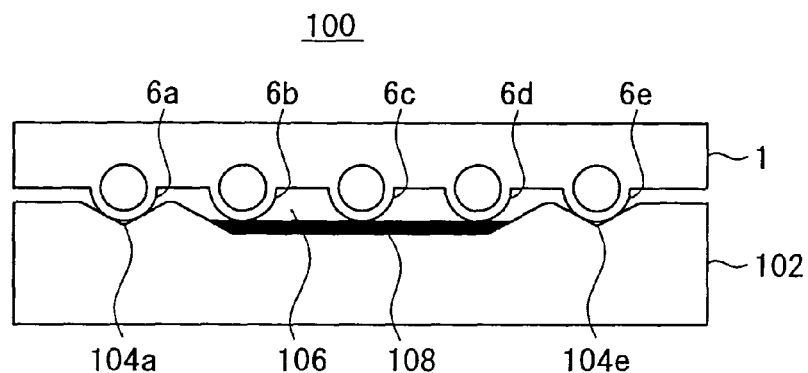
Figure 2B:
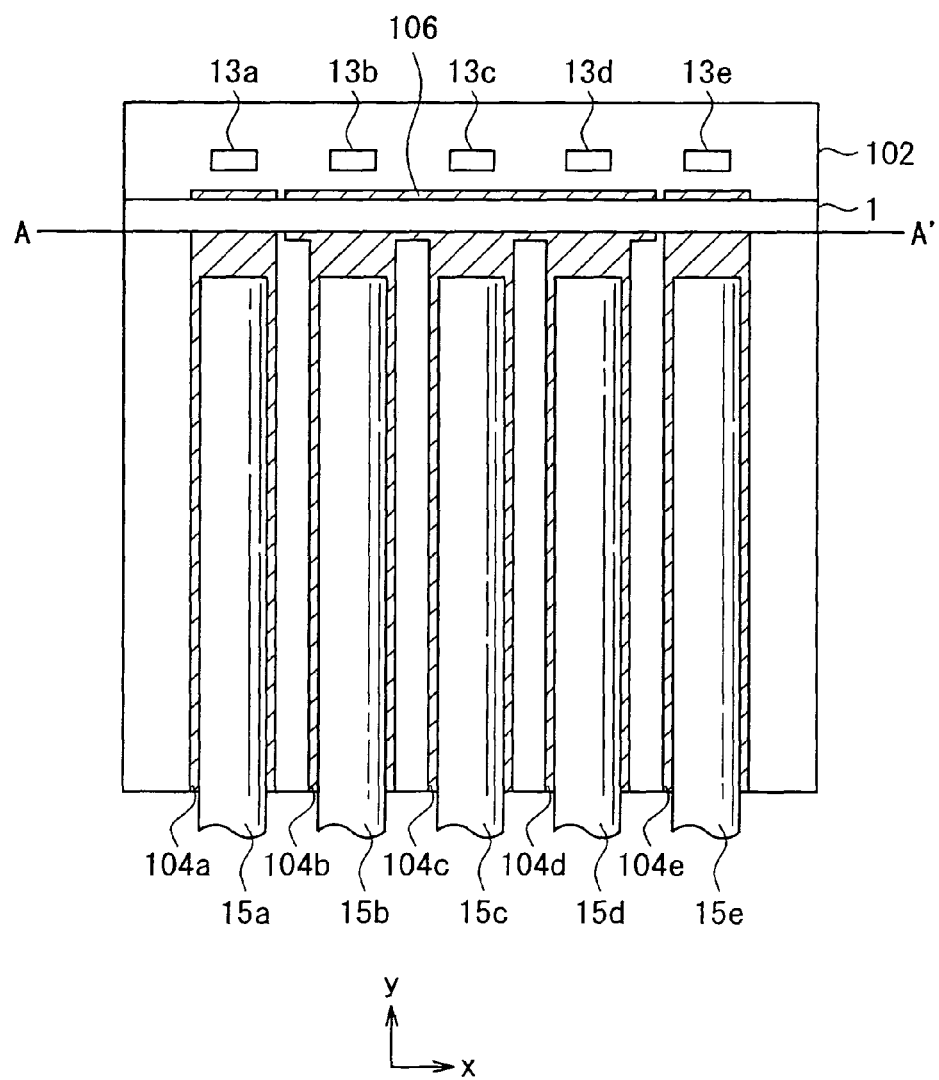
Figure 3:
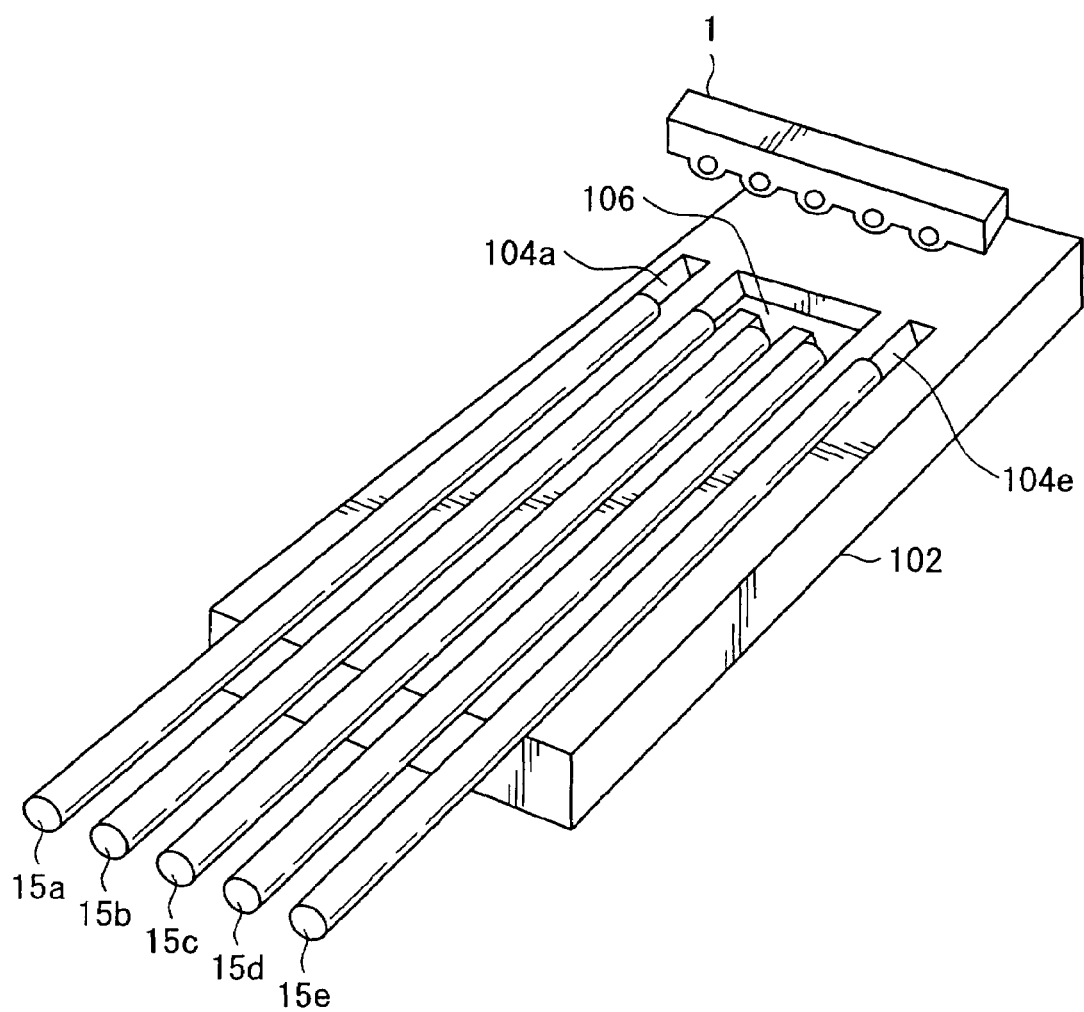
FIG. 3 is a perspective view for explaining the configuration of the optical module according to the first embodiment of the present invention.

FIG. 1 is a perspective view showing the configuration of a lens array serving as an optical member used in an optical module according to the first embodiment of the present invention. FIGS. 2A and 2B and FIG. 3 are a sectional view, an upper view, and a perspective view showing the configuration of the optical module according to the first embodiment of the present invention.

Referring to FIG. 1, the configuration of a lens array 1 will be described below. The lens array 1 is constituted by an optical substrate. The lens array 1 mainly has: five lens sections 2a, 2b, 2c, 2d, and 2e formed in a line on the surface of the optical substrate; five edges 3a, 3b, 3c, 3d, and 3e; a rod-like handle/support 4; and five approximately hog-backed projecting portions 6a, 6b, 6c, 6d, and 6e.

In FIG. 1, reference numerals 2a, 2b, 2c, 2d, and 2e are sequentially added to the lens sections from the leftmost side to the right side. Like the lens sections, reference numerals 3a, 3b, 3c, 3d, and 3e and reference numerals 6a, 6b, 6c, 6d, and 6e are sequentially added to the edges and the projecting portions from the leftmost side to the right side in FIG. 1.

In this case, the five lens sections 2a, 2b, 2c, 2d, and 2e have the same configurations. According to the circumstances, the lens sections 2a, 2b, 2c, 2d, and 2e are generically named as lens sections 2. With respect to the edges and the projecting portions, according to the circumstances, the projecting portions 6a, 6b, 6c, 6d, and 6e are generically named as projecting portions 6, and the edges 3a, 3b, 3c, 3d, and 3e are generically named as edges 3.

The lens sections 2 function as luminous flux converters. The lens sections 2 have circular shapes here, and are each constituted by a diffractive optical device. The lens sections 2 are 8-phase binary diffractive optical devices which are manufactured by repeating photolithography and etching three times. In this case, it is assumed that the optical axes of the lens sections 2 are vertical to the surfaces of the lens sections 2. In the lens array, a surface on which the lens section is formed is called a lens section forming surface.

On the lower sides of the lens sections 2, the edges 3 are partially located serving as the peripheries of the lens sections 2, and the edges 3 have arc shapes along the peripheries of the lens sections 2, respectively. The arc-shaped outlines of the edges 3 extend from the lens section forming surface side to the surface side opposing the lens section forming surface side, and the hog-backed projecting portions 6 downward extending from the handle/support 4 are formed to include the edges 3, respectively. For example, the edge 3a is partially located on the periphery of the lens section 2a, and the projecting portion 6a is formed to include the arc-shaped outline of the edge 3a. Like the lens section 2a, edges and projecting portions are formed on the peripheries of the lens sections 2b, 2c, 2d, and 2e. As shown in FIG. 1, the edges and the projecting portions corresponding to the lens sections 2a, 2b, 2c, 2d, and 2e are represented by 3a, 3b, 3c, 3d, and 3e and 6a, 6b, 6c, 6d, and 6e, respectively.

The projecting portions 6 are portions used in positioning and adhesive fixing when the lens array 1 is mounted. The dimension of the arc-shaped projecting portions 6 is preferably equal to the dimension of an optical fiber which is optically coupled with the lens array 1. In this case, for example, the dimension is set to be $\phi 125$ µm.

The handle/support 4, as shown in FIG. 1, is connected to the lens sections 2 on the upper side of the peripheries of the lens sections 2, extends over the lens sections 2 on a plane almost parallel to the surfaces of the lens sections 2 in the array direction of the lens sections 2, and is integrally connected to the lens sections 2. The upper surface and the side surfaces of the handle/support 4 are flatly formed. Therefore, the handle/support 4 can easily hold the lens array 1 with a holding means from the above or the side. The holding means could, for example, be a tight holding means or a negative pressure holding means such as a negative pressure suction cup for holding the lens array 1 by suction.

The lens array 1 is manufactured in the following manner. That is, a resist coated on a silicon substrate by photolithography is patterned to have a predetermined shape, the resist is used as an etching mask for dry etching, and the resist shape is transferred to the silicon substrate. As a method of dry etching used here, an RIE method (reactive ion etching method), an ICP-Bosch method, or the like is employed. For example, as the silicon substrate to be patterned, an SOI (silicon-on-insulator) substrate is used. The substrate is etched up to a silicon oxide layer of the substrate by the ICP-Bosch method, and the silicon oxide layer is removed from the silicon substrate by using a hydrofluoric acid solution, so that the lens array 1 can be manufactured. The thickness of the lens array 1 is 100 µm.

The configuration of an optical module 100 according to the first embodiment and a mounting method will be described below with reference to FIGS. 2A and 2B and FIG. 3. FIG. 2A is a sectional view of the optical module 100, and the sectional position of the optical module 100 is shown in FIG. 2B as A–A'. The sectional position A–A' is almost the same as a position where the lens section forming surface of the lens array 1 is arranged. FIG. 2B is an upper view of the optical module 100. FIG. 3 is a perspective view for explaining the configuration of the optical module 100.

The optical module 100 has a support substrate 102, a lens array 1 mounted on the support substrate 102, five laser diodes 13a, 13b, 13c, 13d, and 13e, and five optical fibers 15a, 15b, 15c, 15d, and 15e. In FIG. 2B, reference numerals 13a, 13b, 13c, 13d, and 13e are sequentially added to the laser diodes from the leftmost side to the right side. Similarly, reference numerals 15a, 15b, 15c, 15d, and 15e are sequentially added to the optical fibers from the leftmost side to the right. Depending on the circumstances, the five laser diodes 13a, 13b, 13c, 13d, and 13e are generically named as laser diodes 13, and the five optical fibers 15a, 15b, 15c, 15d, and 15e are generically named as optical fibers 15. The dimension of the optical fiber 15 is set to be φ125 μm.

In FIG. 2B, the array direction of the lens sections 2 is defined as an x direction, and the direction vertical to the x direction in the plane of paper is defined as a y direction. The five laser diodes 13 and the five optical fibers 15 are arranged in parallel to the x direction. One of the laser diodes, one of the lens section, and one of the optical fiber are sequentially arranged to have the same optical axis in the y direction, thereby constituting one combination. For example, laser diode 13a, the lens section 2a, and the optical fiber 15a are arranged to have the same optical axis, thereby constituting one combination. The five combinations of the configurations are arranged in parallel to the x direction.

The support substrate 102 is constituted by, e.g., a silicon crystal substrate. The support substrate 102 has five V-shaped grooves 104a, 104b, 104c, 104d, and 104e each having a V-shaped section and a concave groove 106 having an approximately trapezoidal section. These V-shaped grooves 104a, 104b, 104c, 104d, and 104e and the concave groove 106 are accurately formed by using photolithography and etching technique. The three V-shaped grooves 104b, 104c, and 104d communicate with the concave groove 106. In FIG. 2B, reference numerals 104a, 104b, 104c, 104d, and 104e are sequentially added to the V-shaped grooves from the leftmost side to the right side. Depending on the circumstances, these five V-shaped grooves 104a, 104b, 104c, 104d, and 104e are generically named as V-shaped grooves 104. In FIG. 2B, the V-shaped grooves 104 and the concave groove 106 are indicated by hatched areas. In FIG. 3, in order to clearly show the grooves, shows a state obtained before the lens array 1 is mounted, and the laser diodes are omitted.

The five V-shaped grooves 104 are grooves which extend in the y direction, and are formed on the upper surface of the support substrate 102 and arranged in parallel to each other in the x direction. All the five V-shaped grooves 104 are formed from one end of the support substrate 102. However, the lengths of the V-shaped grooves 104 in the y direction are not equal to each other. The lengths of the V-shaped grooves 104b, 104c, and 104d in the y direction are smaller than the lengths of the V-shaped grooves 104a and 104e in the y direction, and the ends of the V-shaped grooves 104b, 104c, and 104d in the y direction are connected to the concave groove 106. The concave groove 106 is a groove the longitudinal direction of which is set as the x direction. The end position of the concave groove 106 in the y direction is designed to be almost equal to the end positions of the V-shaped grooves 104a and 104e in the y direction.

The V-shaped grooves 104 are grooves for mounting optical fibers, and the concave groove 106 is a groove for mounting an optical member. The respective V-shaped grooves 104 have such dimensions that one of the projecting portions 6 of the lens array 1 or one of the optical fibers 15 can be mounted. The concave groove 106 is designed such that, as shown in FIG. 2A, three of the projecting portions 6 of the lens array 1 can be accommodated in the concave groove 106 without being in contact with the concave groove 106.

The lens array 1 is mounted on the support substrate 102 as follows. The projecting portions 6a and 6e at both the ends of the lens array 1 are arranged in the V-shaped grooves 104a and 104e of the support substrate 102, and the projecting portions 6b, 6c, and 6d of the lens array 1 are arranged in the concave groove 106 of the support substrate 102. At this time, as shown in FIG. 2A, the side surfaces of the projecting portions 6a and 6e are brought into partial contact with the side walls of the V-shaped grooves 104a and 104e, and the lens array 1 and the support substrate 102 are in line contact with each other at four points. Accordingly, positioning in a direction vertical to the optical axis is performed. The mounting position accuracy of the lens array is determined by the processing accuracy of the projecting portions 6a and 6e. The processing accuracy is about ±0.5 μm in processing using the ICP-Bosch method.

At this time, the projecting portions 6b, 6c, and 6d are accommodated in the concave groove 106. The side surfaces of these three projecting portions are not in contact with the support substrate 102. A gap is formed between the lower parts of the projecting portions 6b, 6c, and 6d and the bottom surface of the concave groove 106. An adhesive agent 108 is filled in this gap. For this reason, the lens array 1 is adhered to and fixed to the support substrate 102. As the adhesive agent 108, for example, a resin-based thermoset adhesive agent or a resin-based UV cure adhesive agent can be used.

On the support substrate 102, the laser diodes 13a, 13b, 13c, 13d, and 13e are arranged on the opposite side with respect to the lens array 1 to share the optical axes of the lens sections 2a, 2b, 2c, 2d, and 2e, respectively. As shown in FIG. 2B, the five optical fibers 15a, 15b, 15c, 15d, and 15e are arranged in the five V-shaped grooves 104a, 104b, 104c, 104d, and 104e, respectively. In this manner, as shown in FIG. 2B, the optical module 100 having five combinations each of which is obtained by optically coupling one laser diode, one lens section, and one optical fiber with each other is formed.

The operation of the optical module 100 having the above configuration will be described below. Lights emitted from the laser diodes 13 are incident on the lens array 1, subjected to a converging operation by the lens sections 2 of the combinations obtained by optical coupling, converged on the end faces of the optical fibers 15 of the combinations obtained by optical coupling, and transmitted. For example, a light emitted from the laser diode 13a is incident on the lens array 1, subjected to a converging operation by the lens section 2a, converged on the end face of the optical fiber 15a, and transmitted.

As described above, according to this embodiment, actual positioning for the lens array 1 uses two projecting portions 6a and 6e on both the ends of the lens array 1. Therefore, when the manufacturing accuracies of the two projecting portions 6a and 6e fall within a predetermined range, the lens array 1 can be arranged at an appropriate position. Even though the manufacturing accuracies of the three projecting portions 6b, 6c, and 6d stand outside the predetermined range, the manufacturing accuracies do not make the product defective. In the conventional mounting method, it is demanded that the manufacturing accuracies of all the five projecting portions fall within the predetermined range. However, in this embodiment, the manufacturing accuracies of only two projecting portions need to satisfactorily fall within the predetermined range, contributing to an increase in yield.

The lens array 1 and the support substrate 102 are adhered to each other by using the projecting portions 6b, 6c, and 6d. In this manner, the adhering portion of the lens array 1 is designed to be different from the positioning portion of the lens array 1. For this reason, the position where the lens array 1 must be mounted can be accurately determined regardless of a coating condition of the adhesive agent, and the mounting accuracy can be improved.

The configuration of an optical module 200 according to the second embodiment and a method of mounting the optical module 200 will be described below with reference to FIGS. 4 and 5. The optical module 200 has a configuration in which the support substrate 102 and the lens array 1 in the first embodiment are replaced with a support substrate 202 and a lens array 21. The explanation will be performed in consideration of this point. The same reference numerals as in the first embodiment denote the same parts in the second embodiment, and a description thereof will be omitted.

Figure 4A:
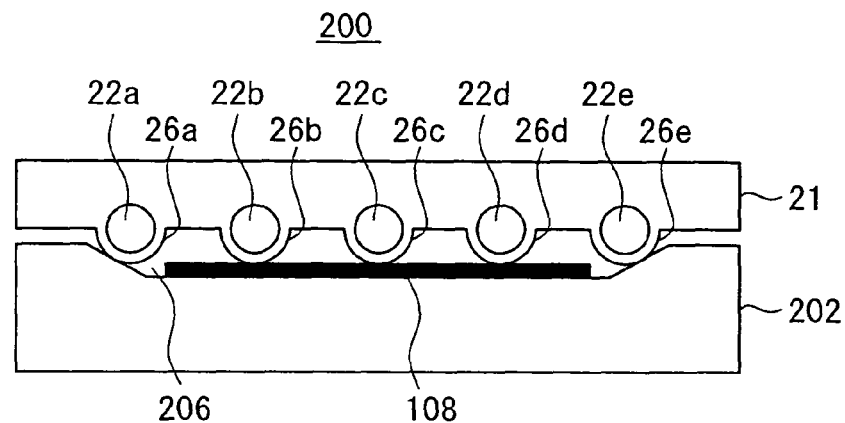
Figure 4B:
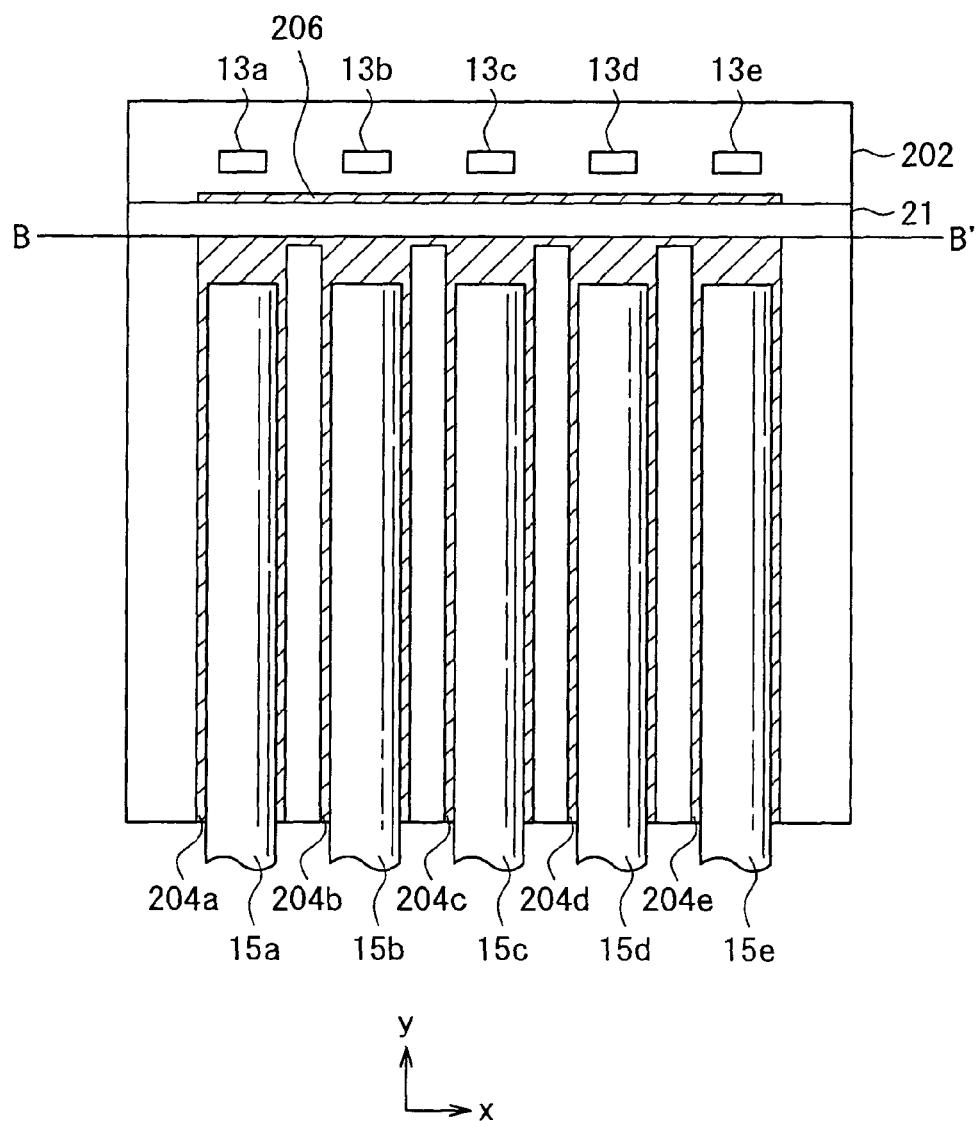
Figure 5:
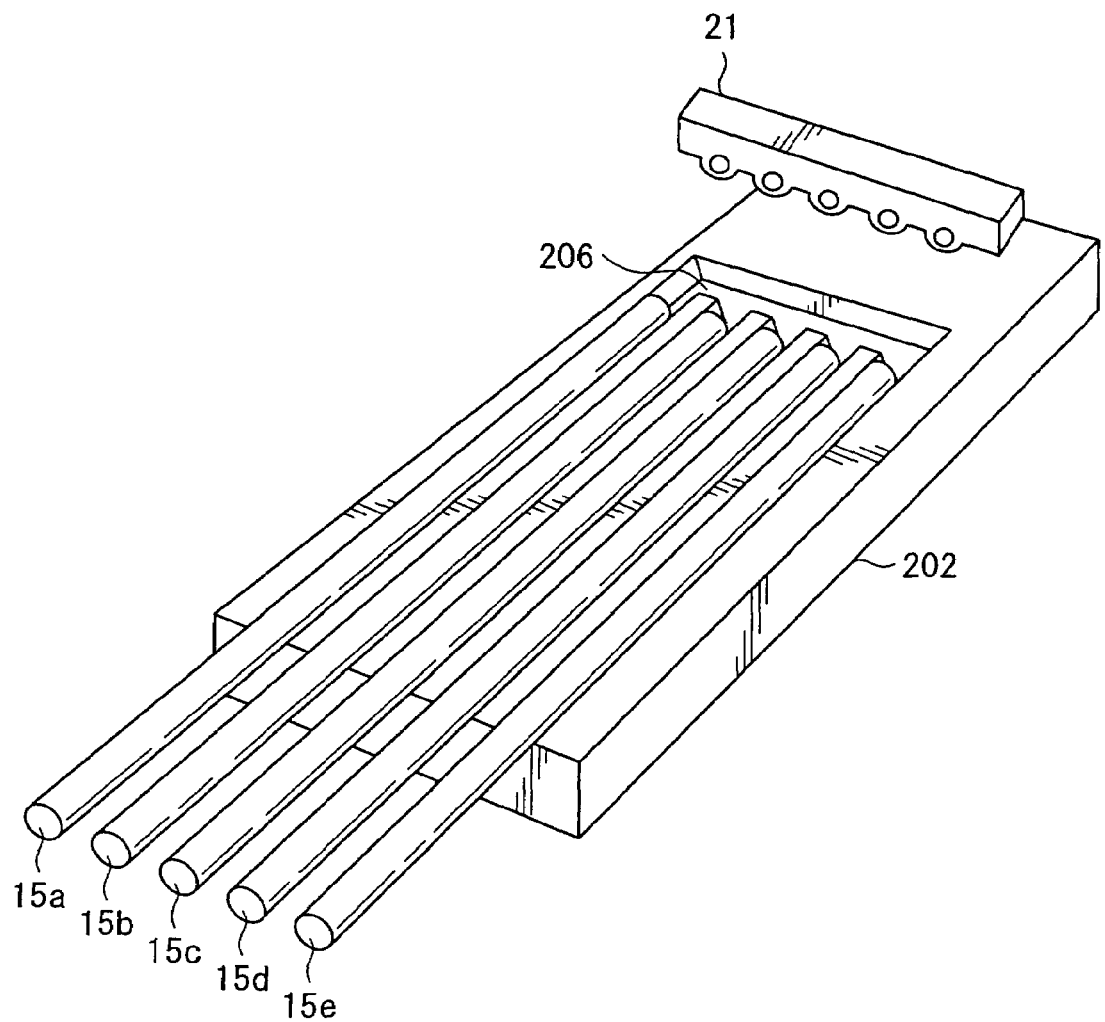
FIG. 5 is a perspective view for explaining the configuration of the optical module according to the second embodiment of the present invention.

FIG. 4A is a sectional view of the optical module 200. The sectional position of the optical module 200 is shown in FIG. 4B as B–B'. The sectional position B–B' is almost equal to the position where the lens section forming surface of the lens array 21 is arranged. FIG. 4B is an upper view of the optical module 200. FIG. 5 is a perspective view for explaining the configuration of the optical module 200. The array direction of the lens sections is defined as an x direction, and a direction vertical to the x direction in the plane of paper is defined as a y direction.

In the lens array 21, in place of the lens sections 2a, 2b, 2c, 2d, and 2e of the lens array 1, lens sections 22a, 22b, 22c, 22d, and 22e constituted by blazed type diffractive optical devices are formed, respectively. Except for this point, the lens array 21 has the same configuration as that of the lens array 1 shown in FIG. 1. The lens array 21 has edges, projecting portions, and a rod-like handle/support 4. In this case, projecting portions corresponding to the lens sections 22a, 22b, 22c, 22d, and 22e in the lens array 21 are represented by 26a, 26b, 26c, 26d, and 26e, respectively. Depending on the circumstances, the lens sections 22a, 22b, 22c, 22d, and 22e are generically named as lens sections 22, and the projecting portions 26a, 26b, 26c, 26d, and 26e are generically named as projecting portions 26. The lens array 21 and the lens sections 22 are manufactured by the same methods as those used when the lens array 1 and the lens sections 2 are manufactured, respectively.

The support substrate 202 is different from the support substrate 102 with respect to the configuration of grooves. The support substrate 202 has five V-shaped grooves 204a, 204b, 204c, 204d, and 204e each having a V-shaped section and a concave groove 206 having an approximately trapezoidal section. These V-shaped grooves 204a, 204b, 204c, 204d, and 204e and the concave groove 206 are accurately formed by using photolithography and an etching technique. In FIG. 4, reference numerals 204a, 204b, 204c, 204d, and 204e are added to the V-shaped grooves from the leftmost side to the right side. Depending on the circumstances, these five V-shaped grooves are generically named as V-shaped grooves 204. The five V-shaped grooves 204 and the concave groove 206 communicate with each other. In FIG. 4B, the V-shaped grooves 204 and the concave groove 206 are indicated by hatched areas. In FIG. 5, in order to clearly show the grooves, is shown a state obtained before the lens array 21 is mounted, and the laser diodes are omitted.

The five V-shaped grooves 204 are grooves which extend in the y direction, and are formed on the upper surface of the support substrate 102 and arranged in parallel to each other in the x direction. All the five V-shaped grooves 204 are formed from one end of the support substrate 202, and the ends of the five V-shaped grooves 204 in the y direction are connected to the concave groove 206. The concave groove 206 is a groove the longitudinal direction of which is set as the x direction. The V-shaped grooves 204 are grooves for mounting optical fibers, and the concave groove 206 is a groove for mounting an optical member.

The respective V-shaped grooves 204 have such dimensions that one of the optical fibers 15 can be mounted. The concave groove 206 is designed such that, as shown in FIG. 4A, the five projecting portions 26 of the lens array 21 can be accommodated in the concave groove 206, the projecting portions 26a and 26e at both the ends are in contact with the side walls of the concave groove 206, and the projecting portions 26b, 26c, and 26d are not in contact with the inner wall of the concave groove 206.

The lens array 21 is mounted on the support substrate 202 as follows. The five projecting portions 26 of the lens array 21 are arranged in the concave groove 206 of the support substrate 202. At this time, as shown in FIG. 4A, the side surfaces of the projecting portions 26a and 26e are brought into partial contact with the side walls of the concave groove 206, and the lens array 21 and the support substrate 202 are in line contact with each other at a total of two points. In this manner, positioning in a direction vertical to the optical axis is performed. The fixing position accuracy of the lens array is determined by the accuracy of the projecting portions 26a and 26e. The processing accuracy is about ±0.5 μm in processing using the ICP-Bosch method.

At this time, the projecting portions 26b, 26c, and 26d are accommodated in the concave groove 206. The side surfaces of these three projecting portions are not in contact with the support substrate 202. A gap is formed between the lower parts of the projecting portions 26b, 26c, and 26d and the bottom surface of the concave groove 206. An adhesive agent 108 is filled in this gap. For this reason, the lens array 21 is adhered to and fixed to the support substrate 202.

On the support substrate 202, the laser diodes 13a, 13b, 13c, 13d, and 13e are arranged on the opposite side with respect to the lens array 21 to share the optical axes of the lens sections 22a, 22b, 22c, 22d, and 22e, respectively. As shown in FIG. 4B, the five optical fibers 15a, 15b, 15c, 15d, and 15e are arranged in the five V-shaped grooves 204a, 204b, 204c, 204d, and 204e, respectively. With the above configuration, as shown in FIG. 4B, the optical module 200 having five combinations, each of which is obtained by optically coupling one laser diode, one lens section, and one optical fiber with each other is formed.

The operation of the optical module 200 having the above configuration will be described below. Lights emitted from the laser diodes 13 are incident on the lens array 21, subjected to a converging operation by the lens sections 22 of the combinations obtained by optical coupling, converged on the end faces of the optical fibers 15 of the combinations obtained by optical coupling, and transmitted.

As described above, according to this embodiment, actual positioning for the lens array 21 uses two projecting portions 26a and 26e on both the ends of the lens array 21. Therefore, when the manufacturing accuracies of the two projecting portions 26a and 26e fall within a predetermined range, the lens array 21 can be arranged at an appropriate position. Even though the manufacturing accuracies of the three projecting portions 26b, 26c, and 26d stand outside the predetermined range, the manufacturing accuracies do not make the product defective. In the conventional mounting method, it is demanded that the manufacturing accuracies of all the five projecting portions fall within the predetermined range. However, in this embodiment, the manufacturing accuracies of only two projecting portions need to satisfactorily fall within the predetermined range, contributing to an increase in yield.

The lens array 21 and the support substrate 202 are adhered to each other by using the projecting portions 26b, 26c, and 26d. In this manner, the adhering portion of the lens array 21 is designed to be different from the positioning portion of the lens array 21. For this reason, the position where the lens array 21 must be mounted can be accurately determined regardless of a coating condition of the adhesive agent, and the mounting accuracy can be improved.

The configuration of an optical module 300 according to the third embodiment and a method of mounting the optical module 300 will be described below with reference to FIGS. 6 and 7. The optical module 300 has a configuration in which the support substrate 102 in the first embodiment is replaced with a support substrate 302. The explanation will be performed in consideration of this point. The same reference numerals as in the first embodiment denote the same parts in the third embodiment, and a description thereof will be omitted.

Figure 6A:
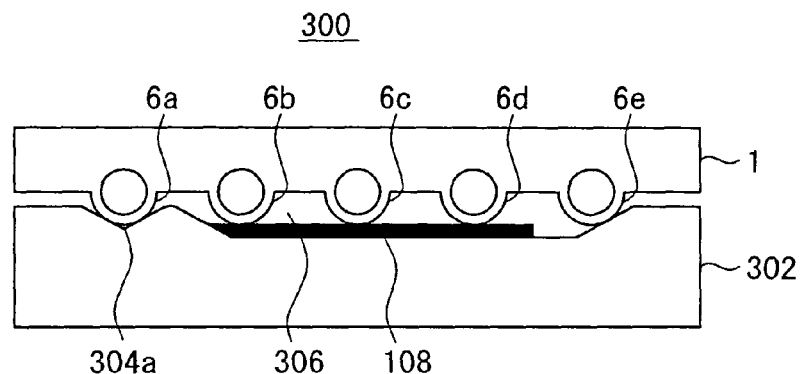
Figure 6B:
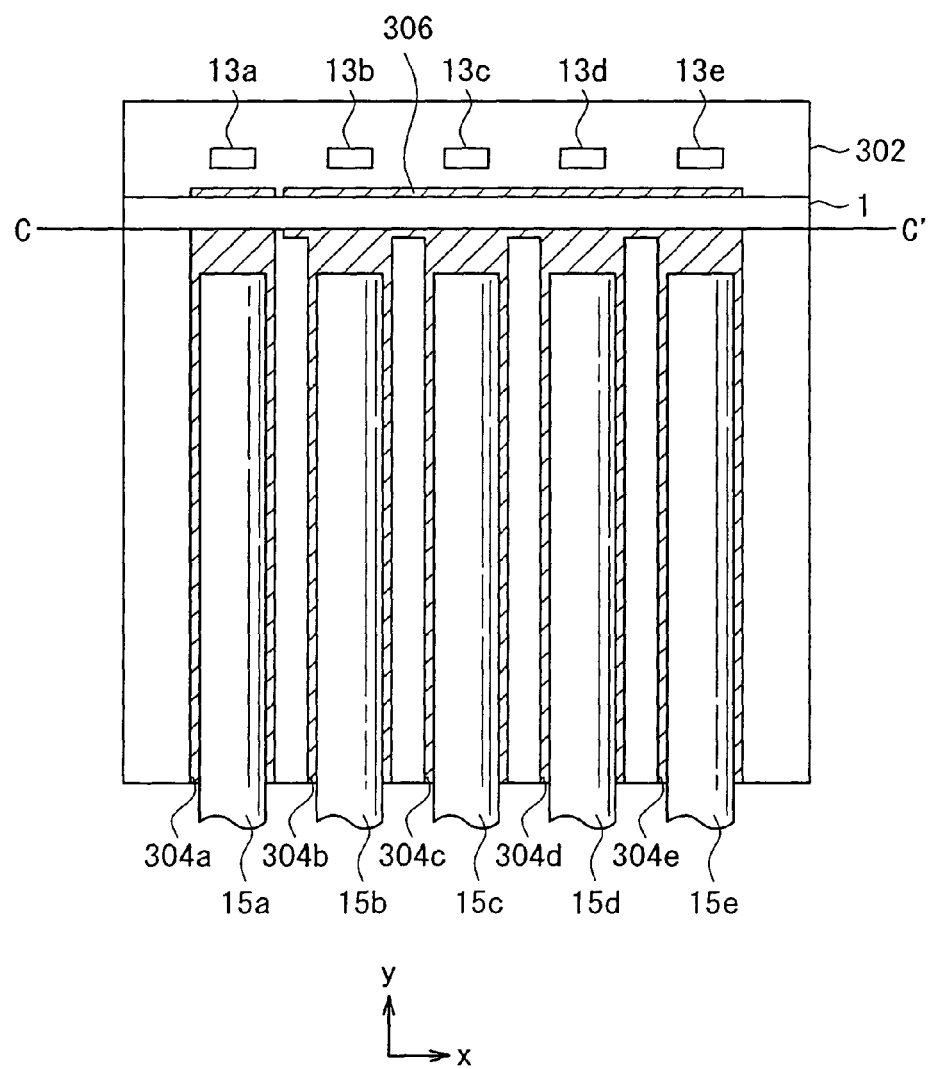
Figure 7:
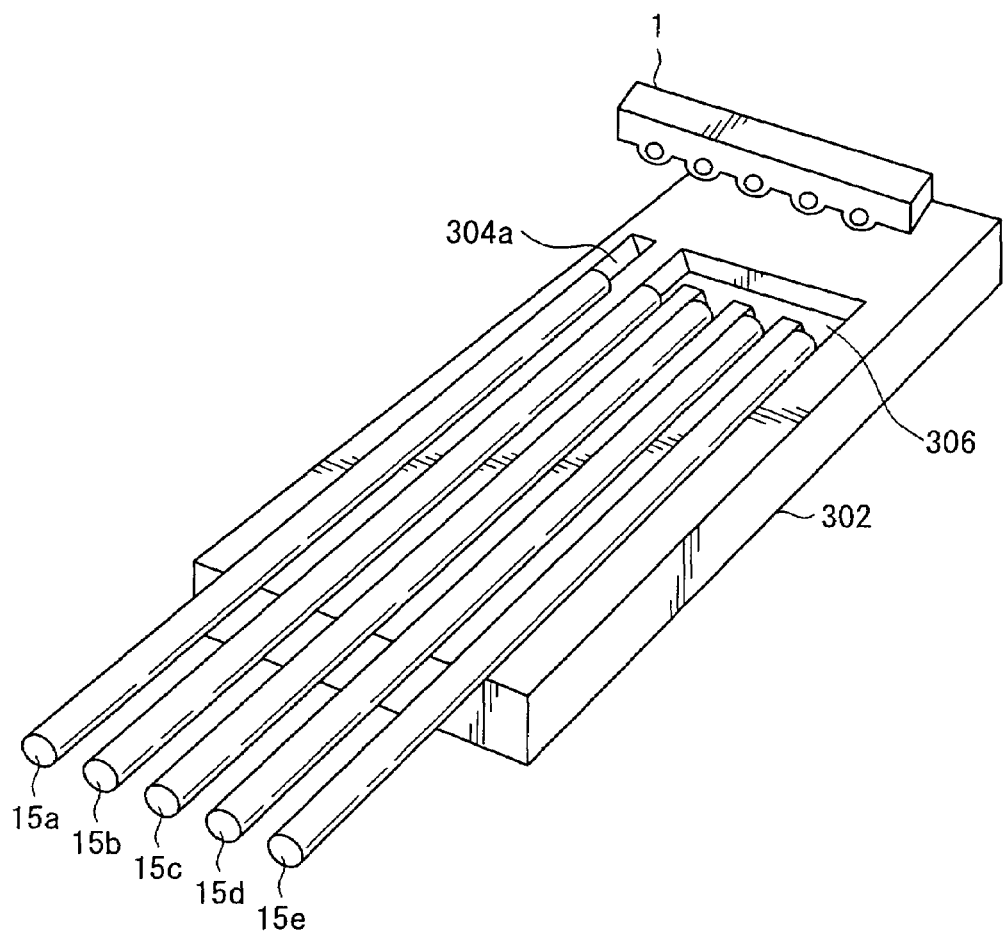
FIG. 7 is a perspective view for explaining the configuration of the optical module according to the third embodiment of the present invention.

FIG. 6A is a sectional view of the optical module 300. The sectional position of the optical module 300 is shown in FIG. 6B as C–C'. The sectional position C–C' is almost equal to the position where the lens section forming surface of the lens array 1 is arranged. FIG. 6B is an upper view of the optical module 300. FIG. 7 is a perspective view for explaining the configuration of the optical module 300. The array direction of the lens sections is defined as an x direction, and a direction vertical to the x direction in the plane of paper is defined as a y direction.

The support substrate 302 is different from the support substrate 102 with respect to the configuration of grooves. The support substrate 302 has five V-shaped grooves 304a, 304b, 304c, 304d, and 304e each having a V-shaped section and a concave groove 306 having an approximately trapezoidal section. These V-shaped grooves 304a, 304b, 304c, 304d, and 304e and the concave groove 306 are accurately formed by using photolithography and an etching technique. In FIG. 6, reference numerals 304a, 304b, 304c, 304d, and 304e are added to the V-shaped grooves from the leftmost side to the right side. Depending on the circumstances, these five V-shaped grooves are generically named as V-shaped grooves 304. The four V-shaped grooves 304b, 304c, 304d and 304e and the concave groove 306 communicate with each other. In FIG. 6B, the V-shaped grooves 304 and the concave groove 306 are indicated by hatched areas. In FIG. 7, in order to clearly show, the grooves, a state obtained before the lens array 1 is mounted, and the laser diodes are omitted.

The five V-shaped grooves 304 are grooves which extend in the y direction, and are formed the upper surface of the support substrate 302 and arranged in parallel to each other in the x direction. Although all the five V-shaped grooves 304 are formed from one end of the support substrate 302, the lengths of the V-shaped grooves 304 in the y direction are not equal to each other. The lengths of the V-shaped grooves 304b, 304c, 304d, and 304e in the y direction are smaller than the length of the V-shaped grooves 304a in the y direction, and the ends of the V-shaped grooves 304b, 304c, 304d, and 304e in the y direction are connected to the concave groove 306. The concave groove 306 is a groove the longitudinal direction of which is set as the x direction. The end position of the concave groove 306 in the y direction is designed to be almost equal to the end position of the V-shaped groove 304a in the y direction.

The V-shaped grooves 304 are grooves for mounting optical fibers, and the concave groove 306 is a groove for mounting an optical member. The respective V-shaped grooves 304 have such dimensions that one of the projecting portions 6 of the lens array 1 or one of the optical fibers 15 can be mounted. The concave groove 306 is designed such that, as shown in FIG. 2A, four of the projecting portions 6 of the lens array 1 can be accommodated in the concave groove 306. When one of the four projecting portions 6 is brought into contact with the side wall of the concave groove 306, the other three projecting portions 6 are not in contact with the inner wall of the concave groove 306.

The lens array 1 is mounted on the support substrate 302 as follows. The projecting portion 6a of the lens array 1 is arranged in the V-shaped groove 304a of the support substrate 302, and the projecting portions 6b, 6c, 6d, and 6e of the lens array 1 are arranged in the concave groove 306 of the support substrate 302. At this time, as shown in FIG. 6A, the side surfaces of the projecting portions 6a and 6e are brought into partial contact with the side walls of the V-shaped groove 304a and the concave groove 306 respectively, and the lens array 1 and the support substrate 302 are in line contact with each other at a total of three points. In this manner, positioning in a direction vertical to the optical axis is performed. The fixing position accuracy of the lens array is determined by the accuracy of the projecting portions 6a and 6e. The processing accuracy is about ±0.5 μm in processing using the ICP-Bosch method.

At this time, the projecting portions 6b, 6c, and 6d are accommodated in the concave groove 306. The side surfaces of these three projecting portions are not in contact with the support substrate 302. A gap is formed between the lower parts of the projecting portions 6b, 6c, and 6d and the bottom surface of the concave groove 306. An adhesive agent 108 is filled in this gap. For this reason, the lens array 1 is adhered to and fixed to the support substrate 302.

On the support substrate 302, the laser diodes 13a, 13b, 13c, 13d, and 13e are arranged on the opposite side with respect to the lens array 1 to share the optical axes of the lens sections 2a, 2b, 2c, 2d, and 2e, respectively. As shown in FIG. 6B, the five optical fibers 15a, 15b, 15c, 15d, and 15e are arranged in the five V-shaped grooves 304a, 304b, 304c, 304d, and 304e, respectively. With the above configuration, as shown in FIG. 6B, the optical module 300 having five combinations each of which is obtained by optically coupling one laser diode, one lens section, and one optical fiber with each other is formed.

The operation of the optical module 300 having the above configuration will be described below. Lights emitted from the laser diodes 13 are incident on the lens array 1, subjected to a converging operation by the lens sections 2 of the combinations obtained by optical coupling, converged on the end faces of the optical fibers 15 of the combinations obtained by optical coupling, and transmitted.

As described above, according to this embodiment, actual positioning for the lens array 1 uses two projecting portions 6a and 6e on both the ends of the lens array 1. Therefore, when the manufacturing accuracies of the two projecting portions 6a and 6e fall within a predetermined range, the lens array 1 can be arranged at an appropriate position. Even though the manufacturing accuracies of the three projecting portions 6b, 6c, and 6d stand outside the predetermined range, the manufacturing accuracies do not make the product defective. In the conventional mounting method, it is demanded that the manufacturing accuracies of all the five projecting portions fall within the predetermined range. However, in this embodiment, the manufacturing accuracies of only two projecting portions need to satisfactorily fall within the predetermined range, contributing to an increase in yield.

The lens array 1 and the support substrate 302 are adhered to each other by using the projecting portions 6b, 6c, and 6d. In this manner, the adhering portion of the lens array 1 is designed to be different from the positioning portion of the lens array 1. For this reason, the position where the lens array 1 must be mounted can be accurately determined regardless of a coating condition of the adhesive agent, and the mounting accuracy can be improved. Furthermore, this embodiment is compared with the second embodiment. As a result, since the number of points of line contact is larger in this embodiment than in the second embodiment, the lens array 1 and the support substrate 302 can be prevented from being loosely fitted, and mounting can be performed at higher accuracy.

The configuration of an optical module 400 according to the fourth embodiment and a method of mounting the optical module 400 will be described below with reference to FIGS. 8 and 9. The optical module 400 has a configuration in which the support substrate 102 in the first embodiment is replaced with a support substrate 402. The explanation will be performed in consideration of this point. The same reference numerals as in the first embodiment denote the same parts in the third embodiment, and a description thereof will be omitted.

Figure 8A:
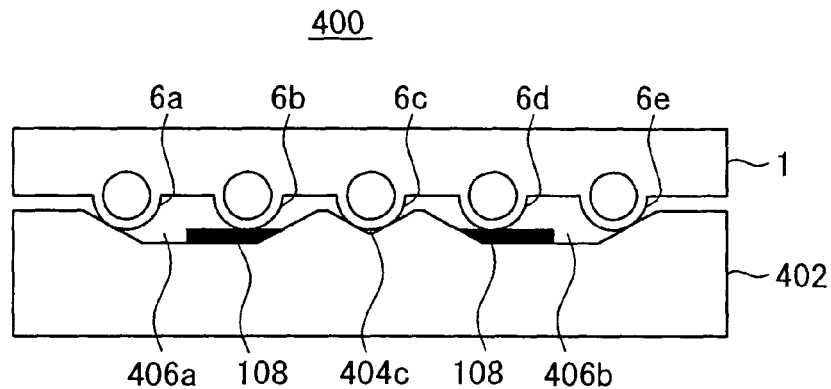
Figure 8B:
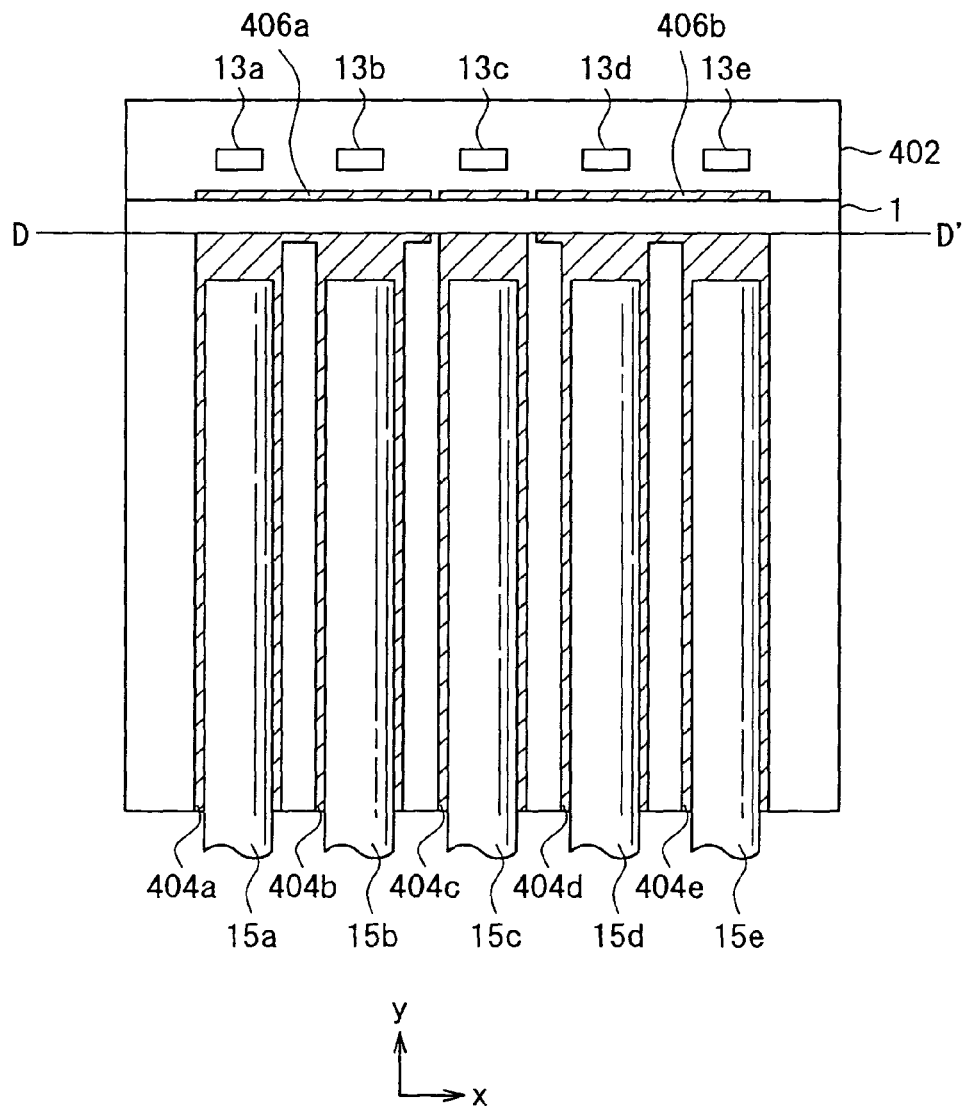
Figure 9:
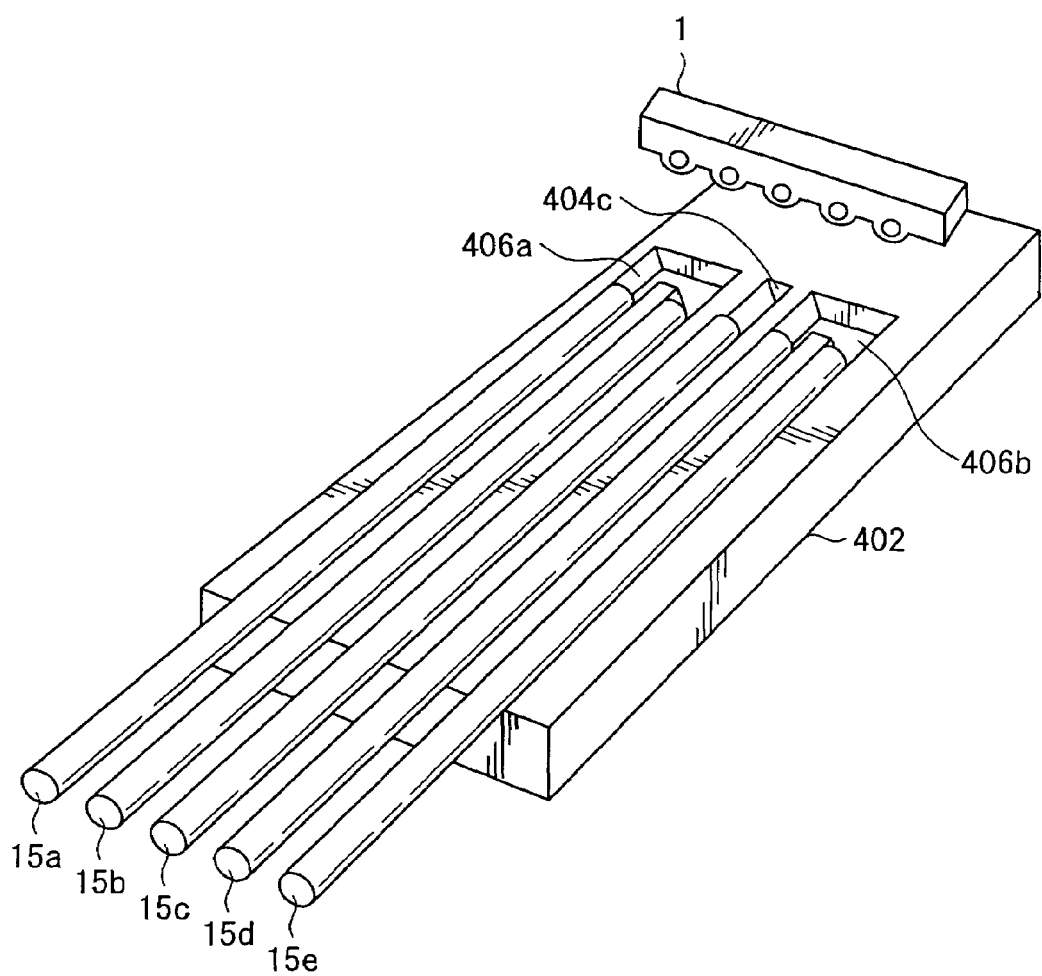
FIG. 9 is a perspective view for explaining the configuration of the optical module according to the fourth embodiment of the present invention.

FIG. 8A is a sectional view of the optical module 400. The sectional position of the optical module 400 is shown in FIG. 8B as D–D'. The sectional position D–D' is almost equal to the position where the lens section forming surface of the lens array 1 is arranged. FIG. 8B is an upper view of the optical module 400. FIG. 9 is a perspective view for explaining the configuration of the optical module 400. The array direction of the lens sections is defined as an x direction, and a direction vertical to the x direction in the plane of paper is defined as a y direction.

The support substrate 402 is different from the support substrate 102 with respect to the configuration of grooves. The support substrate 402 has five V-shaped grooves 404a, 404b, 404c, 404d, and 404e each having a V-shaped section and two concave grooves 406a and 406b each having an approximately trapezoidal section. These V-shaped grooves 404a, 404b, 404c, 404d, and 404e and the concave grooves 406a and 406b are accurately formed by using photolithography and an etching technique. In FIG. 8, reference numerals 404a, 404b, 404c, 404d, and 404e are added to the V-shaped grooves from the leftmost side to the right side. Depending on the circumstances, these five grooves are generically named as V-shaped grooves 404. The V-shaped grooves 404a and 404b and the concave groove 406a communicate with each other, and the V-shaped grooves 404d and 404e communicate with the concave groove 406b. In FIG. 8B, the V-shaped grooves 404 and the concave grooves 406a and 406b are indicated by hatched areas. In FIG. 9, in order to clearly show the grooves, is shown a state obtained before the lens array 1 is mounted, and the laser diodes are omitted.

The five V-shaped grooves 404 are grooves which extend in the y direction, and are formed on the upper surface of the support substrate 402 and arranged in parallel to each other in the x direction. Although all the five V-shaped grooves 404 are formed from one end of the support substrate 402, the lengths of the V-shaped grooves 404 in the y direction are not equal to each other. The lengths of the V-shaped grooves 404a, 404b, 404d, and 404e in the y direction are smaller than the length of the V-shaped grooves 404c in the y direction, and the ends of the V-shaped grooves 404a and 404b in the y direction are connected to the concave groove 406a, and the ends of the V-shaped grooves 404d and 404e in the y direction are connected to the concave groove 406b. The concave grooves 406a and 406b are grooves the longitudinal directions of which are set as the x direction. The end positions of the concave grooves 406a and 406b in the y direction are designed to be almost equal to the end position of the V-shaped groove 404c in the y direction.

The V-shaped grooves 404 are grooves for mounting optical fibers, and the concave grooves 406a and 406b are grooves for mounting an optical member. The respective V-shaped grooves 404 have such dimensions that one of the projecting portions 6 of the lens array 1 or one of the optical fibers 15 can be mounted. The concave grooves 406a and 406b are designed such that, as shown in FIG. 8A, two of the projecting portions 6 of the lens array 1 can be accommodated in the concave grooves 406a and 406b. When one of the two projecting portions 6 is brought into contact with the side wall of the concave grooves 406a and 406b, the other projecting portion 6 is not in contact with the inner wall of the concave grooves 406a and 406b.

The lens array 1 is mounted on the support substrate 402 as follows. The projecting portions 6a and 6b of the lens array 1 are arranged in the concave groove 406a of the support substrate 402, the projecting portion 6c of the lens array 1 is arranged in the V-shaped groove 404c, and the projecting portions 6d and 6e of the lens array 1 are arranged in the concave groove 406b of the support substrate 402. At this time, as shown in FIG. 8A, the side surfaces of the projecting portion 6a are brought into partial contact with the side walls of the V-shaped groove 406a, the side surfaces of the projecting portion 6c are brought into partial contact with the side walls of the V-shaped groove 404c, the side surfaces of the projecting portion 6e are brought into partial contact with the side walls of the concave groove 406b and the lens array 1 and the support substrate 402 are in line contact with each other at a total of four points. In this manner, positioning in a direction vertical to the optical axis is performed. The fixing position accuracy of the lens array is determined by the accuracy of the projecting portion 6a, 6c, and 6e. The processing accuracy is about ±0.5 μm in processing using the ICP-Bosch method.

At this time, the projecting portions 6a and 6b are arranged in the concave groove 406a, the projecting portions 6d and 6e are arranged in the concave groove 406b, and the side surfaces of the projecting portions 6b and 6d are not in contact with the support substrate 402. A gap is formed between the lower part of the projecting portions 6b and the bottom surface of the concave groove 406a, and a gap is formed between the lower part of the projecting portion 6d and the bottom surface of the concave groove 406b. An adhesive agent 108 is filled in these gaps. For this reason, the lens array 1 is adhered to and fixed to the support substrate 402.

On the support substrate 402, the laser diodes 13a, 13b, 13c, 13d, and 13e are arranged on the opposite side with respect to the lens array 1 to share the optical axes of the lens sections 2a, 2b, 2c, 2d, and 2e, respectively. As shown in FIG. 8B, the five optical fibers 15a, 15b, 15c, 15d, and 15e are arranged in the five V-shaped grooves 404a, 404b, 404c, 404d, and 404e, respectively. With the above configuration, as shown in FIG. 8B, the optical module 400 having five combinations each of which is obtained by optically coupling one laser diode, one lens section, and one optical fiber with each other, is formed.

The operation of the optical module 400 having the above configuration will be described below. Lights emitted from the laser diodes 13 are incident on the lens array 1, subjected to a converging operation by the lens sections 2 of the combinations obtained by optical coupling, converged on the end faces of the optical fibers 15 of the combinations obtained by optical coupling, and transmitted.

As described above, according to this embodiment, actual positioning for the lens array 1 uses projecting portions 6a, 6c, and 6e. Therefore, when the manufacturing accuracies of the three projecting portion 6a, 6c, and 6e fall within a predetermined range, the lens array 1 can be arranged at an appropriate position. Even though the manufacturing accuracies of the other two projecting portions 6b and 6d stand outside the predetermined range, the manufacturing accuracies do not make the product defective. In the conventional mounting method, it is demanded that the manufacturing accuracies of all the five projecting portions fall within the predetermined range. However, in this embodiment, the manufacturing accuracies of only three projecting portions need to satisfactorily fall within the predetermined range, contributing to an increase in yield.

The lens array 1 and the support substrate 402 are adhered to each other by using the projecting portions 6b and 6d. In this manner, the adhering portion of the lens array 1 is designed to be different from the positioning portion of the lens array 1. For this reason, the position where the lens array 1 must be mounted can be accurately determined regardless of a coating condition of the adhesive agent, and the mounting accuracy can be improved.

In this embodiment, positioning is performed by using not only the projecting portions on both the ends but also the center projecting portion. This embodiment is effective when an optical member such as a long lens array which can be transformed is mounted at high accuracy.

The configuration of an optical module 500 according to the fifth embodiment and a method of mounting the optical module 500 will be described below with reference to FIGS. 10 and 11. The optical module 500 has a configuration in which the lens array 21 according to the second embodiment is replaced with a lens array 51. The explanation will be performed in consideration of this point. The same reference numerals as in the second embodiment denote the same parts in the third embodiment, and a description thereof will be omitted.

Figure 10A:
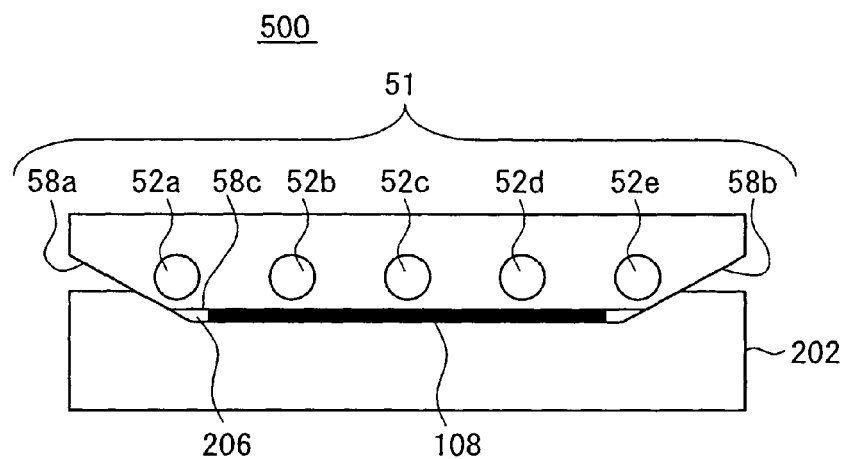
Figure 10B:
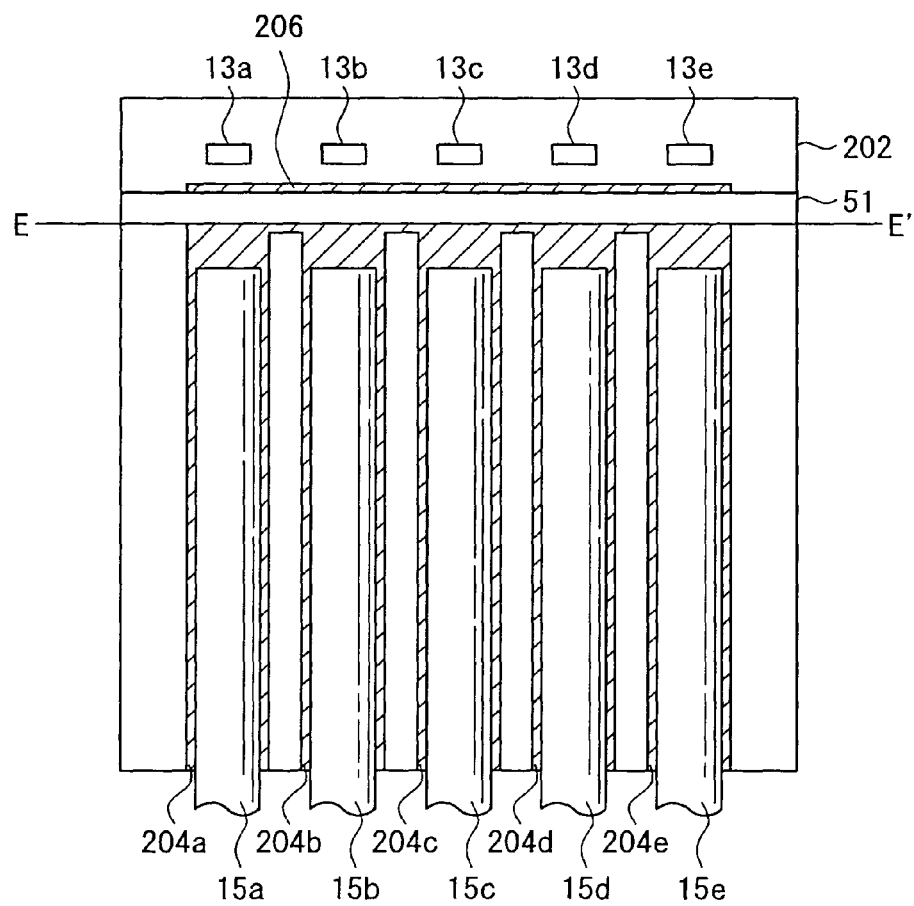
Figure 11:
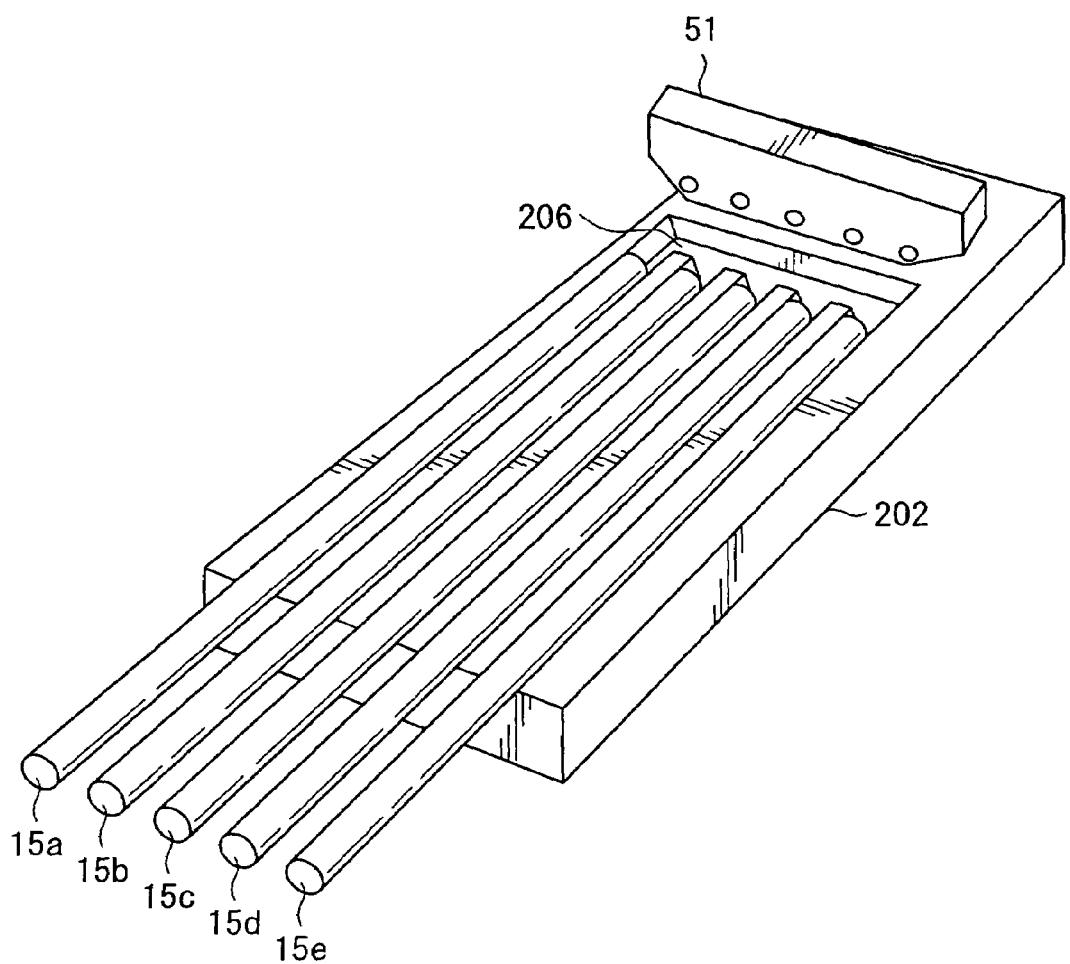
FIG. 11 is a perspective view for explaining the configuration of the optical module according to the fifth embodiment of the present invention.

FIG. 10A is a sectional view of the optical module 500. The sectional position of the optical module 500 is shown in FIG. 10B as E–E'. The sectional position E–E' is almost equal to the position where the lens section forming surface of the lens array 51 is arranged. FIG. 10B is an upper view of the optical module 500. FIG. 11 is a perspective view for explaining the configuration of the optical module 500. The array direction of the lens sections is defined as an x direction, and a direction vertical to the x direction in the plane of paper is defined as a y direction. In FIG. 11, in order to clearly show the grooves, is shown a state obtained before the lens array 51 is mounted, and the laser diodes are omitted.

The lens array 51 mainly has five lens sections 52a, 52b, 52c, 52d, and 52e formed in a line on the surface of an optical substrate. In FIG. 10A, reference numerals 52a, 52b, 52c, 52d, and 52e are added to the lens sections from the leftmost side to the right side. Depending on the circumstances, these lens sections 52a, 52b, 52c, 52d, and 52e are generically named as lens sections 52. The lens array 51 has an outline which is different from those of the lens arrays 1 and 21, and has an outline having an approximately boat shape in a plane parallel to a lens section forming surface.

The lens sections 52, like the lens sections 2, are 8-phase binary diffractive optical devices. The lens sections 52 can be manufactured like the lens sections 2. In manufacturing the lens array 51, after the lens sections 52 are formed in a line on a silicon substrate, a rectangular portion including the lens sections 52 is cut out of the silicon substrate by dicing or the like and separated from the silicon substrate. The rectangular portion is polished to form oblique side surfaces 58a and 58b shown in FIG. 10A. The side surfaces 58a and 58b are formed to be in tight contact with the side surfaces of the concave groove 206 of the support substrate 202. In this case, the thickness of the silicon substrate used to manufacture the lens array 51 is 600 μm, and the thickness of the manufactured lens array 51 is also 600 μm. In FIG. 10A, the differences between the thickness of the lens array 51 and the thicknesses of the lens arrays 1 and 21 are not always precisely illustrated.

The lens array 51 is mounted on the support substrate 202 as follows. The bottom of the boat-shaped portion of the lens array 51 is arranged in the concave groove 206 of the support substrate 202. At this time, as shown in FIG. 10A, the side surfaces 58a and 58b are brought into partial contact with the side walls of the concave groove 206, and the lens array 51 and the support substrate 202 are in surface contact with each other. In this manner, positioning in a direction vertical to the optical axis is performed. The fixing position accuracy of the lens array is determined by the accuracy of the side surfaces 58a and 58b. The processing accuracy is about −0.7 μm.

At this time, the bottom of the boat-shaped portion of the lens array 51 is accommodated in the concave groove 206. A bottom surface 58c of the bottom is not in contact with the support substrate 202. A gap is formed between the bottom surface 58c and the bottom surface of the concave groove 206. An adhesive agent 108 is filled in this gap. For this reason, the lens array 51 is adhered to and fixed to the support substrate 202.

On the support substrate 202, the laser diodes 13a, 13b, 13c, 13d, and 13e are arranged on the opposite side with respect to the lens array 51 to share the optical axes of the lens sections 52a, 52b, 52c, 52d, and 52e, respectively. As shown in FIG. 10B, the five optical fibers 15a, 15b, 15c, 15d, and 15e are arranged in the five V-shaped grooves 204a, 204b, 204c, 204d, and 204e, respectively. With the above configuration, as shown in FIG. 10B, the optical module 500 having five combinations each of which is obtained by optically coupling one laser diode, one lens section, and one optical fiber with each other, is formed.

The operation of the optical module 500 having the above configuration will be described below. Lights emitted from the laser diodes 13 are incident on the lens array 51, subjected to a converging operation by the lens sections 52 of the combinations obtained by optical coupling, converged on the end faces of the optical fibers 15 of the combinations obtained by optical coupling, and transmitted.

As described above, according to this embodiment, actual positioning for the lens array 51 uses two side surfaces 58a and 58b. Therefore, when the manufacturing accuracies of the two side surfaces 58a and 58b fall within a predetermined range, the lens array 51 can be arranged at an appropriate position.

The lens array 51 and the support substrate 202 are adhered to each other by using the bottom surface 58c. In this manner, the adhering portion of the lens array 51 is designed to be different from the positioning portion of the lens array 51. For this reason, the position where the lens array 51 must be mounted can be accurately determined regardless of a coating condition of the adhesive agent, and the mounting accuracy can be improved. Furthermore, an adhesive area in this embodiment can be made larger than those in the above embodiments, and an optical module having adhesion strength and high reliability can be provided.

In this embodiment, an optical module having only one lens array has been described. However, when the arrangement of grooves of a support substrate is changed, an optical module having two or more lens arrays can be structured. As examples of this optical module, the first modification and second modification of the second embodiment are shown in FIGS. 12 and 13.

Figure 12:
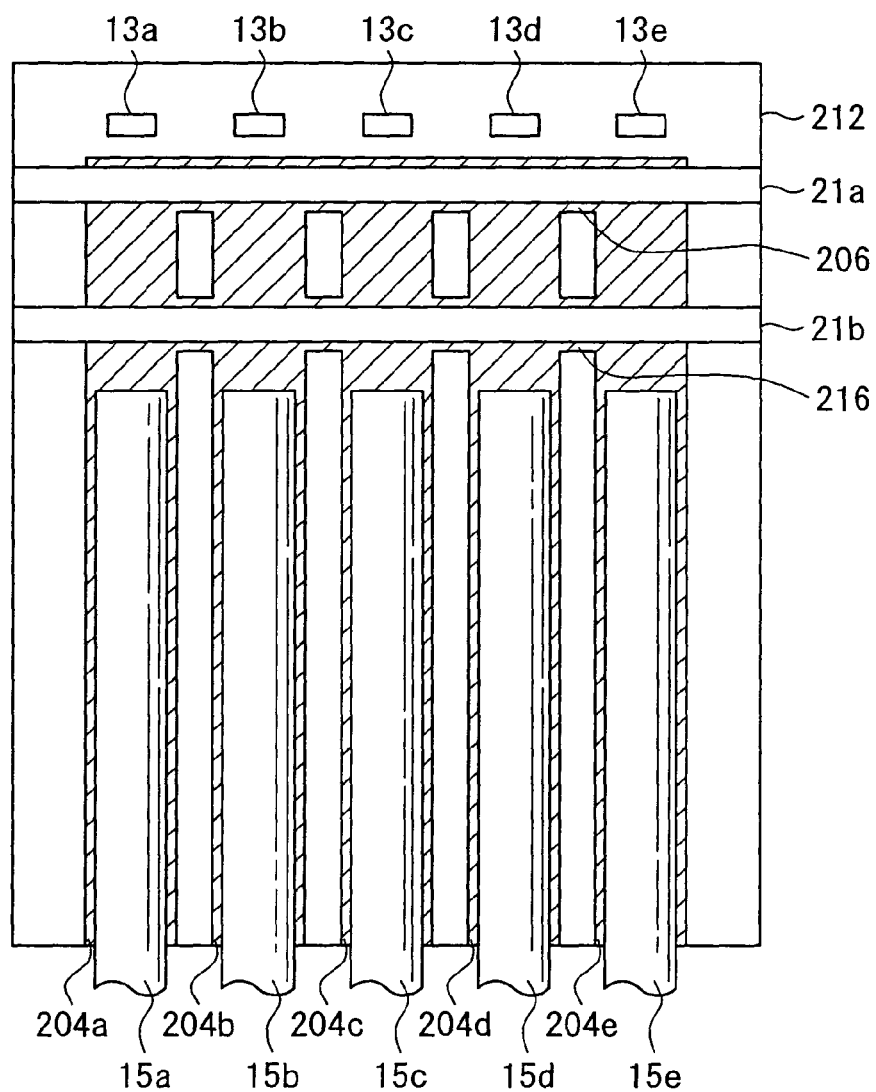
FIG. 12 is an upper view of an optical module according to a first modification of the present invention.
Figure 13:
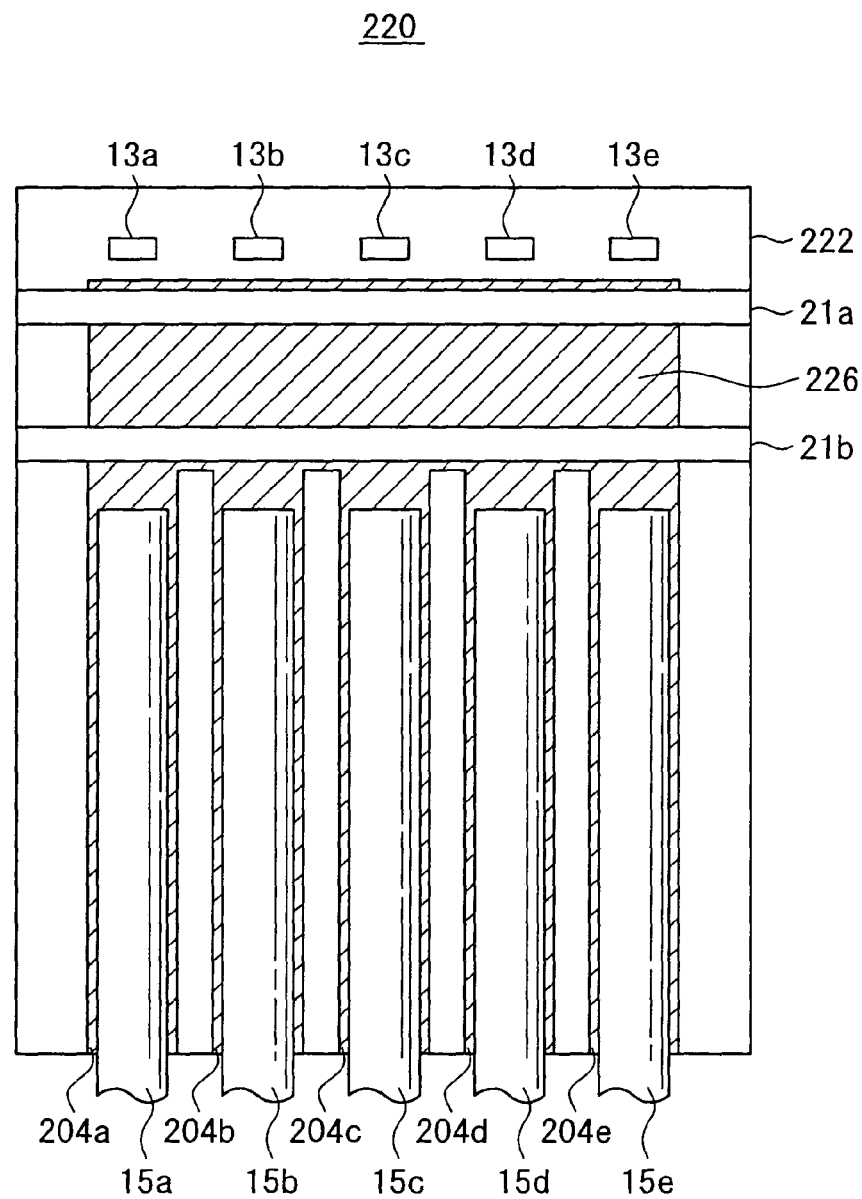
FIG. 13 is an upper view of an optical module according to a second modification of the present invention.

FIG. 12 is an upper view of an optical module 210 serving as the first modification. The optical module 210 has a configuration in which the lens array 21 and the support substrate 202 in the second embodiment are replaced with two lens arrays 21*a* and 21*b* and a support substrate 212. In consideration of this point, the same configuration as that in the second embodiment is not repeated.

The two lens arrays 21*a* and 21*b* are lens arrays each having the same configuration as that of the lens array 21. In the lens array 21*a*, the lens sections are arranged on the laser diode side such that the lens sections oppose the corresponding laser diodes. In the lens array 21*b*, the lens sections are arranged on the optical fiber side such that the lens sections oppose the end faces of the corresponding optical fibers.

The support substrate 212 is different from the support substrate 202 in the arrangement of grooves. The support substrate 212 is obtained such that a concave groove 216 having the same arrangement of the concave groove 206 is added in parallel to the concave groove 206. The concave groove 216 is accurately formed by using photolithography and an etching technique. The concave groove 216, like the concave groove 206, is a groove for mounting an optical member. The concave groove 216 is located between the concave groove 206 and the end faces of the optical fibers 15. In this case, the five V-shaped grooves 204 communicate with the two concave grooves 206 and 216. In FIG. 12, the V-shaped grooves 204 and the concave grooves 206 and 216 are indicated by hatched areas.

As in the second embodiment, the lens arrays 21*a* and 21*b* are arranged in the concave grooves 206 and 216, respectively. The two projecting portions at both the ends of the lens arrays 21*a* and 21*b* are brought into contact with the concave grooves and positioned, and the three central projecting portions are used to adhere the lens arrays to the support substrate 212.

In the optical module 210, lights emitted from the laser diodes 13 are incident on the lens array 21*a* and collimated by the lens sections of the combination by optical coupling. The collimated lights are incident on the lens array 21*b*, subjected to a converging operation by the lens sections of the combinations obtained by optical coupling, converged on the end faces of the optical fibers 15 of the combinations obtained by optical coupling, and transmitted. Also in the first modification, the same effect as in the second embodiment can be obtained.

FIG. 13 is an upper view of an optical module 220 serving as the second modification. The optical module 220 has a configuration in which the support substrate 212 according to the first modification is replaced with a support substrate 222. In consideration of this point, the same configuration as that in the first modification is not repeated.

The support substrate 222 is different from the support substrate 212 in the arrangement of grooves. The support substrate 222 has the following configuration. That is, a groove is also formed between the concave groove 206 and the concave groove 216 on the support substrate 212, and the concave groove 206 and the concave groove 216 are inte-grated to form a large concave groove 226. The concave groove 216 is accurately formed by using photolithography and an etching technique. The concave groove 226 is a groove for mounting an optical member. In this case, the five V-shaped grooves 204 communicate with the concave groove 226. The sectional shape of the concave groove 226, like the concave groove 206, has an approximately trapezoidal section. In FIG. 13, the V-shaped grooves 204 and the concave groove 226 are indicated by hatched areas.

The lens arrays 21*a* and 21*b* are arranged near both the end faces of the concave groove 226 in the y direction. As in the second embodiment, the lens arrays 21*a* and 21*b* are positioned such that the two projecting portions formed at both the ends of each of the lens arrays 21*a* and 21*b* are in contact with the concave groove 226, and the three central projecting portions are used to adhere the lens arrays 21*a* and 21*b* to the support substrate 222. The operation of the optical module 220 is the same as the operation of the optical module 210. In the second modification, the same effect as in the second embodiment can be obtained.

A configuration of a modification using the two lens arrays as shown in FIGS. 12 and 13 is can be applied to not only the second embodiment, but also the other embodiments.

In the example described above, a binary diffractive optical device or blazed type diffractive optical device is used as a lens section. However, the invention can be applied to an optical element which can be manufactured on a substrate. For example, a refractive lens section may be used. As the shape of the lens section, not only a circular shape but also a desired shape can be employed. The shape of the lens sections, the edges, the handle/support and the projecting portions is not limited to the above example, and various shapes can be proposed. In the example described above, a lens array having five lens sections is exemplified. However, the number of lens sections of the lens array is not limited to five, and a lens array having an arbitrary number of lens sections can be employed.

In the first to fourth embodiments, the ICP-Bosch method is used as a method of etching the side surfaces of the lens arrays. However, another etching method, such as an ICP-RIE method depending on selection of etching masks can be used. As in the fifth embodiment, a lens array which is formed by etching and polishing can also be applied. As a substrate for a lens array, a silicon substrate is used. However, a substrate which is optically transparent in a communication waveband can be applied. V-shaped grooves are used as grooves for mounting optical fibers formed on a support substrate. However, grooves having another section such as an approximately trapezoidal section can be employed if optical fibers can be held without an obstruction.

In the above example, coupling a laser diode serving as a light-emitting device with an optical fiber is exemplified. However, the present invention can also be applied to coupling a light-receiving device with an optical fiber. In the above example, a luminous flux converter and an optical member are exemplified as a lens section and a lens array, respectively. However, the luminous flux converter and the optical member are not limited to the lens section and the lens array, respectively.

Figure 14:
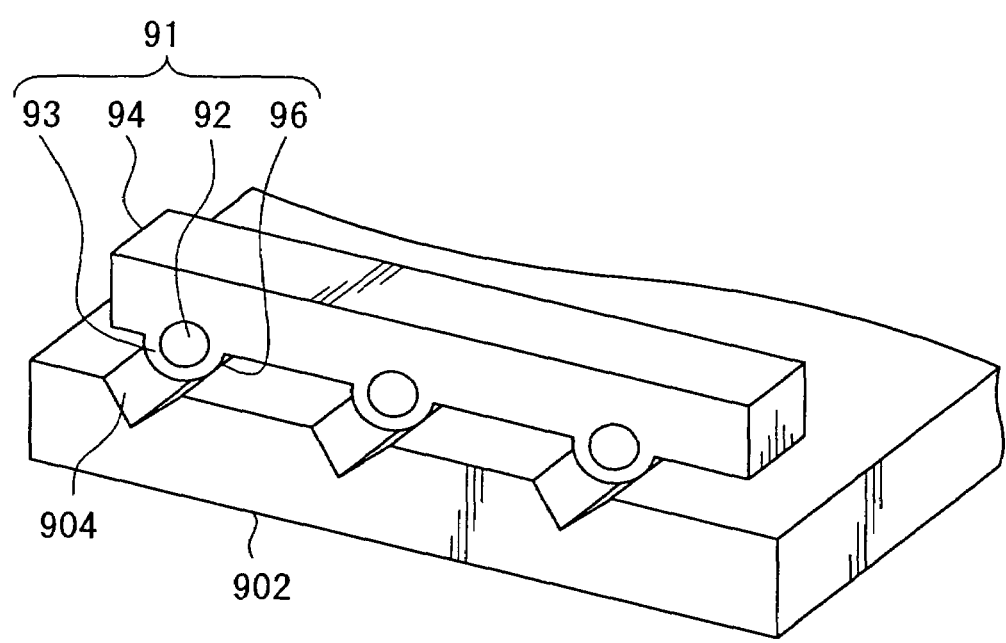
FIG. 14 is a perspective view showing a state in which a lens array is mounted by using a conventional method.

FIG. 14 is a perspective view showing a state in which a lens array is mounted by using a conventional method for comparison. Although a lens array 91 has the same configuration as that of the lens array 1 shown in FIG. 1, the number of lens sections is changed. For descriptive convenience, a lens array 91 having three lens sections is exemplified.

However, the number of lens section is not limited to three. The lens array 91 is obtained by integrating a plurality of lens sections 92. The lens array 91 mainly has the plurality of lens sections 92 formed in a line on the surface of the optical substrate and a handle/support 94 which integrally connecting all the lens sections 92 on the upper sides of the peripheries of the lens sections 92. Edges 93 are formed under the peripheries of the lens sections 92, respectively. The edges 93 have arc shapes along the peripheries of the lens sections 92. The arc-shaped outlines of the edges 93 extend from a lens section forming surface side to a counter surface side to form hog-backed projecting portions 96.

FIG. 14 shows a state in which the lens array 91 is mounted on the support substrate 902. A plurality of V-shaped grooves 904 are formed in the support substrate 902, and the shapes and intervals of the V-shaped grooves 904 depend on the shapes and the intervals of the projecting portions 96. When the lens array 91 is mounted, the lens array 91 is arranged such that the projecting portions 96 are brought into contact with the V-shaped grooves 904, thereby positioning the lens array 91. The contact portions are adhered and fixed.

However, in this mounting method, since the contact portions are adhered and fixed, the fixing position of an optical member is misaligned due to the thickness of an adhesive agent, and positioning cannot be accurately performed. As a result, mounting accuracy becomes poor. In this mounting method, in order to match the projecting portions 96 to the V-shaped grooves 904, the projecting portions 96 must be accurately formed such that the dimensions of all the projecting portions 96 stand within a predetermined range. For example, in manufacturing steps, even though the dimensions of only one of the plurality of projecting portions 96 of the lens array 91 are larger than predetermined values, the lens array 91 cannot be mounted on an appropriate position. For this reason, the product becomes defective to cause a decrease in yield.

In this manner, the conventional mounting method has problems related to positioning and yield. In contrast to this, in the present invention, when an optical member is mounted, a positioning portion is different from a position where adhesion is performed. For this reason, mounting can be accurately performed without generating a positioning error caused by the thickness of an adhesive agent. In the present invention, the number of portions used for positioning the optical member can be made smaller than that of a conventional technique, and the number of portions which require manufacturing accuracies standing within a predetermined range decreases. For this reason, the present invention can contribute to an increase in yield.

The preferred embodiments according to the present invention have been described above with reference to the accompanying drawings. However, the present invention is not limited to the embodiments, as a matter of course. It is apparent that a person skilled in the art can think up various changes or modifications without departing from the spirit and scope of the invention. It is understood that these changes or modifications are included in the spirit and scope of the invention as a matter of course.

What is claimed is:

1. A method for mounting an optical member on a support substrate, the optical member having a plurality of luminous flux converters formed in a line on a surface of an optical substrate, and the support substrate having at least one positioning groove, said method comprising:

bringing parts of side surfaces of at least two of a plurality of projecting portions into contact with the at least one positioning groove so as to position the optical member, wherein the projecting portions are formed for respective luminous flux converters so as to project, and wherein the plurality of projecting portions include edges that are partially along respective peripheries of the plurality of luminous flux converters;

accommodating other projecting portions of the plurality of projecting portions, other than the at least two of the plurality of projecting portions, in a substrate groove formed in the support substrate, which substrate groove could be a groove of the at least one positioning groove or could be an additional groove, without contacting the other projecting portions with the substrate groove, and filling an adhesive agent between at least one part of side surfaces of the other projecting portions without contact with the substrate groove and the support substrate so as to adhere the optical member to the support substrate.

2. The mounting method of claim 1, wherein the at least two of the plurality of projecting portions are formed at both ends of the line of luminous flux converters.

3. The mounting method of claim 1, wherein the at least one positioning groove comprises the substrate groove such that the at least two of the plurality of projecting portions are in contact with the substrate groove and the other projecting portions are not in contact with the substrate groove.

4. The mounting method of claim 1, wherein the substrate groove, accommodating the other projecting portions of the plurality of projecting portions without contacting the other projecting portions with the substrate groove, is different from at least one said positioning groove.

5. The mounting method of claim 1, wherein the substrate groove is in addition to at least one positioning groove, one of the at least two of the projecting portions having two contact points with one said positioning groove.

6. An optical module comprising:

an optical member having a plurality of luminous flux converters formed in a line on a surface of an optical substrate; and a support substrate having at least one positioning groove;

wherein at least two parts of side surfaces of at least two of a plurality of projecting portions are in contact with the at least one positioning groove so as to position the optical member, wherein the projecting portions are formed for respective luminous flux converters so as to project, and wherein the plurality of projecting portions include edges that are partially along respective peripheries of the plurality of luminous flux converters; and wherein other projecting portions of the plurality of projecting portions, other than the at least two of the plurality of projecting portions, are accommodated in a substrate groove formed in the support substrate, which substrate groove could be a groove of the at least one positioning groove or could be an additional groove, without contacting the other projecting portions with the substrate groove, and an adhesive agent is filled between at least one part of side surfaces of the other projecting portions without contact with the substrate groove and the support substrate so as to adhere the optical member to the support substrate.

7. The optical module of claim 6, wherein the at least two of the plurality of projecting portions are formed at both ends of the line of luminous flux converters.

8. The optical module of claim 6, wherein the at least one positioning groove comprises the substrate groove such that the at least two of the plurality of projecting portions are in contact with the substrate groove and the other projecting portions are not in contact with the substrate groove.

9. The optical module of claim 6, wherein the substrate groove, accommodating the other projecting portions of the plurality of projecting portions without contacting the other projecting portions with the substrate groove, is different from at least one said positioning groove.

10. The optical module of claim 6, wherein the substrate groove is in addition to at least one positioning groove, one of the at least two of the projecting portions having two contact points with one said positioning groove.

11. The optical module of claim 6, and further comprising:
a plurality of optical fibers;
a plurality of optical devices each having a light-emitting or light receiving function;
wherein:
the support substrate further includes a plurality of grooves for mounting optical fibers arranged parallel to each other,
the plurality of optical fibers are mounted in the grooves for mounting the plurality of optical fibers, respectively, and
at least one combination is formed by optically coupling one of the optical fibers with one of the optical devices through at least one of the luminous flux converters.

12. The optical module of claim 11, wherein the number of luminous flux converters, the number of optical fibers, and the number of optical devices are equal to each other.

13. The optical module of claim 11, wherein the at least one positioning groove or the substrate groove communicates with at least two of the grooves for mounting the optical fibers.

14. The optical module of claim 11, the at least one positioning groove comprises the substrate groove and the substrate groove communicates with all of the grooves for mounting the optical fibers.

15. The optical module of claim 11, wherein:
the total number of the at least one positioning groove and the substrate groove is at least two grooves;
the number of grooves for mounting optical fibers is at least three;
one groove, of the at least two grooves, has two contact parts of said at least two parts of side surfaces of at least two of a plurality of projecting portions and is different from another groove of the at least two grooves accommodating the other projecting portions without contacting the other projecting portions;
the one groove of the at least two grooves communicates with one of the grooves for mounting the optical fibers; and
the other groove of the at least two grooves communicates with a plurality of grooves for mounting optical fibers.

16. The optical module of claim 11, wherein the optical member includes a plurality of optical members arranged parallel to each other.

* * * * *